Jan. 7, 1958 V. A. NEEPER 2,819,448
PORTABLE INSTRUMENT
Filed Jan. 12, 1956
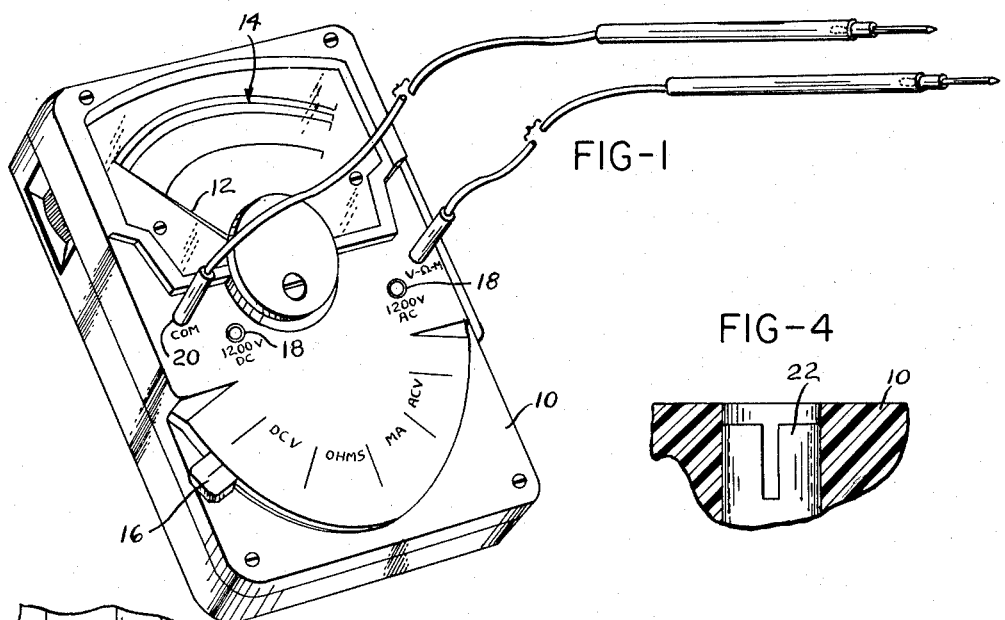
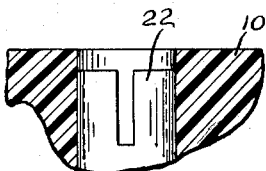
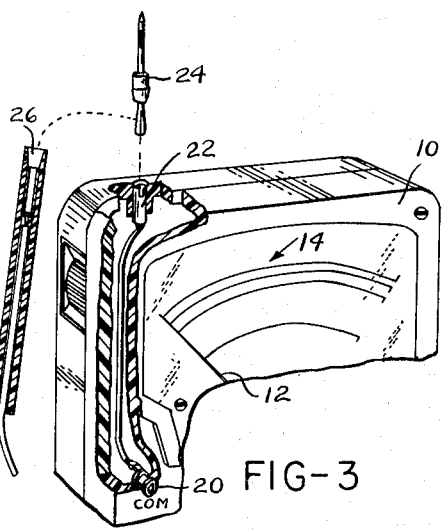
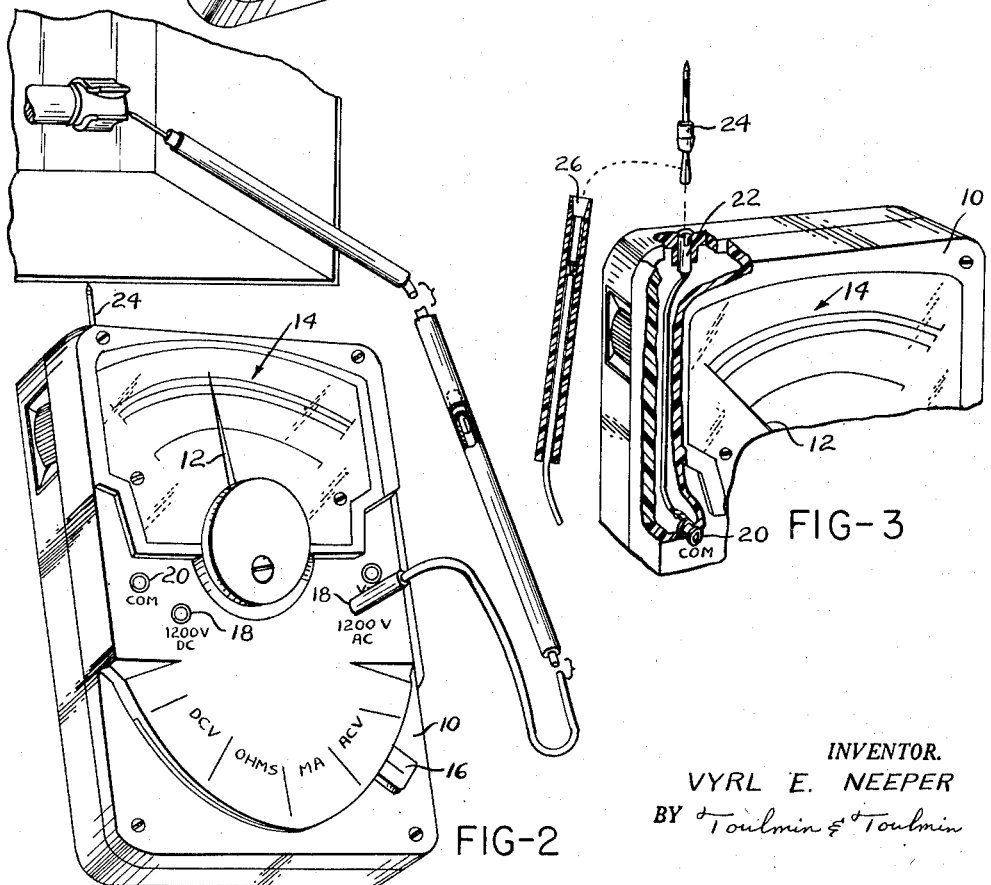
INVENTOR.
VYRL E. NEEPER
BY Toulmin & Toulmin
ATTORNEYS _United States Patent Office_

2,819,448
Patented Jan. 7, 1958

2,819,448

PORTABLE INSTRUMENT

Vyrl A. Neeper, Bluffton, Ohio, assignor to The Triplett Electrical Instrument Co., Bluffton, Ohio, a corporation of Ohio Application January 12, 1956, Serial No. 558,725

4 Claims. (Cl. 324—149)

This invention relates to an electrical instrument, and is particularly concerned with a portable type testing instrument such as a volt-ohm-ammeter.

A quite common type of test instrument employed by television and radio servicemen, and also by electricians, is the portable type volt-ohm-ammeter. This instrument is adapted for measuring D. C. and A. C. volts, ohms, and D. C. amperes, generally in the ampere range.

Instruments of this nature are usually provided with a pair of flexible test probes so that connections can be made with the source to be measured. This arrangement is satisfactory in most instances, but occasionally it is difficult to find a place to rest the instrument, and a problem immediately rises of supporting the instrument and manipulating two probes simultaneously.

The present invention is particularly concerned with an improvement of an instrument of this nature which imparts greater utility to the instrument and which avoids the difficulty referred to above in a great many instances.

A particular object of this invention is the imparting of greater flexibility and adaptability to portable type test instruments.

Another object of this invention is the provision of a portable test instrument which can be operated with a single probe if necessary.

A further object of this invention is the provision of a small portable test instrument which can readily be used in locations where it is necessary to hold the instrument in the hand.

Still another object of the present invention is the provision, in a portable test instrument, of an auxiliary means for effecting one of the connections of the instrument to the source to be measured, but which auxiliary means is protected and shielded against being touched by the user of the instrument.

These and other objects and advantages of this invention will become more apparent upon reference to the following specification taken in connection with the accompanying drawings, wherein:

Figure 1 is a perspective view showing an instrument according to the present invention with flexible test probes of the usual type connected therewith;

Figure 2 is a perspective view similar to Figure 1 but showing the instrument of this invention being used with a single flexible probe;

Figure 3 is a perspective view showing the manner in which a socket is added to the end of the instrument for receiving the probe tip when the instrument is used, as illustrated in Figure 2; and Figure 4 is a fragmentary sectional view showing the added socket to the end of the instrument and the manner in which it is located to prevent accidental touching thereof.

Referring to the drawings somewhat more on detail, the instrument shown in Figure 1 is a substantially conventional portable test instrument of the volt-ohm-ammeter type. The instrument comprises a case 10, in the upper end of which is an instrument movement comprising a pointer 12 sweeping over a calibrated dial face 14. The lower portion of case 10 houses a switch which includes a selector lever 16 for selecting the range of the instrument and the type of operation thereof.

In the body of the case, toward the center thereof, there are located receptacle elements 18 for receiving the ends of flexible probes for connecting one side of the instrument to be measured. An additional receptacle at 20 is provided whereby the other side of the instrument can also be connected with the source.

According to the present invention the receptacle 20 is connected in circuit with an additional receptacle 22 located in the upper end of case 10, as will best be seen in Figures 3 and 4. Receptacle 22 is availed of for receiving metallic tip element 24 which is detachably connected with the end of one of the flexible probe elements.

The arrangement is such that, in circumstances where it is either necessary or preferable to hold the test instrument in the hand, connections can be made to the source to be measured withmout manipulating two flexible test probes.

This is done by removing the metallic tip 24 from one of the probe leads and inserting it in receptacle 22; whereupon the other flexible lead can be inserted in one of the receptacles 18 and the metallic tip thereof engages one side of the source to be measured, while manipulation of the instrument case which is held in the hand will effect engagement of the metallic tip element 24 with the other side of the source.

Since metallic tip element 24 is removable from its socket 26, as illustrated in Figure 3, it is possible for the two flexible test leads to be coupled together, as shown in Figure 2, thus affording the operator a double-length lead for use with the instrument.

It will be noted in Figure 4 that receptacle 22 is recessed downwardly into the case so that it is substantially impossible for accidental contact to be made therewith.

It will be understood that this invention is susceptible to modification in order to adapt it to different usages and conditions, and accordingly it is desired to comprehend such modifications within this invention as may fall within the scope of the appended claims.

I claim:

1. A portable electric measuring instrument of a size adapted for being grasped in the hand having electric receptacles on the face thereof, flexible electric test leads having terminals adapted for being inserted in said receptacles for electrical connection of the instrument to a source to be measured, said leads having metallic probe elements on their outer ends and one of said probe elements being detachable from its lead, an auxiliary electric receptacle in the upper end wall of the case of the instrument electrically connected with one of the said receptacles on the face of the instrument, and said auxiliary receptacle being adapted for supportingly detachably receiving said detachable probe element whereby the instrument can be utilized with a single flexible test lead.

2. In combination; a portable electrical test instrument having a case adapted for being grasped in the hand having metallic electric receptacles on the face thereof, flexible electric test probes having metallic end parts adapted for being received in said receptacles, said test probes also having metallic end portions at their outer ends, an auxiliary metallic electric receptacle recessed into the upper end wall of the case of said instrument and electrically connected with one side of the instrument movement, one of said metallic end portions of said probes being detachable therefrom, and said auxiliary receptacle being adapted for detachably receiving and supporting said end portion whereby the entire instrument case can be grasped in the hand and utilized as one of the probes, 3. In combination; an electrical instrument small enough to be grasped in the hand and having electric receptacles on the face thereof electrically connected with the instrument and each adapted for receiving and making electrical connection with one end of a flexible electric test lead, each test lead having an elongated metallic probe tip on the outer end thereof, at least one of said tips being detachable from its lead, an additional metallic receptacle in the upper end wall of said instrument adjacent the corner thereof adapted for detachably receiving and supporting said detachable probe tip, one of said detachable probe tip and said additional receptacle comprising resilient means to effect electrical connection therebetween, and said additional receptacle being electrically connected inside said instrument with one of said receptacles on the face of said instrument whereby the instrument case can be utilized as one of the probes by which it is connected to a source to be measured.

4. In combination; an electrical instrument small enough to be grasped in the hand and having electric receptacles on the face thereof electrically connected with the movement of the instrument, flexible test leads having metal terminals at one end adapted for being received in said receptacles, each test lead having an elongated metallic probe tip forming the terminal on the outer end thereof, one of said probe tips being detachable from its lead, an auxiliary receptacle in the upper end wall of said instrument adjacent the corner thereof adapted for detachably receiving and supporting said detachable probe tip, said detachable probe tip having a split end part adapted for yieldingly engaging the receptacle to effect electrical connection therewith, and said auxiliary receptacle being electrically connected with one of said receptacles on the face of said instrument whereby the instrument case can be utilized as one of the probes by which it is connected to a source to be measured, said auxiliary receptacle being recessed into the said case to prevent accidental touching thereof.

References Cited in the file of this patent

UNITED STATES PATENTS

| | | |
|---|---|---|
| 2,575,279 | Linton | Nov. 13, 1951 |
| 2,632,785 | Knopp | Mar. 24, 1953 |

FOREIGN PATENTS

| | | |
|---|---|---|
| 337,881 | Great Britain | Nov. 13, 1930 |